FREQUENCY SELECTIVE SYSTEMS

Filed April 26, 1947 9 Sheets-Sheet 1

INVENTOR
C. H. TOWNES
BY Harry C. Hart
ATTORNEY

INVENTOR
C. H. TOWNES
BY Harry C. Hart
ATTORNEY

INVENTOR
C. H. TOWNES
BY Harry C. Hart
ATTORNEY

INVENTOR
C. H. TOWNES
BY Harry C. Hart
ATTORNEY

INVENTOR
C. H. TOWNES
BY Harry C. Hart
ATTORNEY

INVENTOR
C. H. TOWNES
BY Harry C. Hart
ATTORNEY

INVENTOR
C. H. TOWNES
BY Harry C. Hart
ATTORNEY

INVENTOR
C. H. TOWNES
BY Harry C. Hart
ATTORNEY

INVENTOR
C. H. TOWNES
BY Harry C. Hart
ATTORNEY

United States Patent Office 2,707,235

Patented Apr. 26, 1955

2,707,235

FREQUENCY SELECTIVE SYSTEMS

Charles H. Townes, Chatham, N. J., assignor to Bell Telephone Laboratories, Incorporated, New York, N. Y., a corporation of New York Application April 26, 1947, Serial No. 744,236

26 Claims. (Cl. 250—36)

This invention relates to the generation and translation of electromagnetic energy at ultra-high frequencies.

Among the objects of the invention are: to select a desired narrow band of microwave frequencies from a broader band present in a microwave system; to stabilize the oscillations of a microwave generator at a desired frequency; to modulate such oscillations, either in amplitude or in frequency, in accordance with a signal; to demodulate amplitude-modulated or frequency-modulated microwave oscillations and detect the signal contained therein; and to provide a reliable ultra-high frequency standard against which resonant devices of various types may be calibrated.

These and other objects are attained in accordance with the invention by the utilization in a novel manner of the natural molecular resonance absorption characteristics of gases. It has been found that individual molecules of various substances manifest a sharply resonant behavior in the presence of ultra-high frequency electromagnetic fields, the frequency or frequencies of resonance being characteristic of the particular molecule. When these substances are in the form of gases the separation between neighboring molecules is such that the dynamical coupling between each molecule and its neighbors is of a low order. Consequently a mass of such a gas resonates at the same frequency as does each of its individual component molecules, and at neighboring frequencies in a comparatively narrow resonance absorption band, while the quantity of microwave energy absorbed at resonance is vastly increased as compared with the energy absorbed by a single molecule.

In accordance with the invention the resonant absorption characteristics of the various gases are utilized in the following manner. A mass of a gas or of a mixture of gases, having a resonant absorption band or bands at a desired frequency or frequencies, is confined in a suitable chamber at suitable pressure, and there exposed to a microwave field. For example, the gas may be confined in a pipe, tube, wave guide, or chamber having reflecting walls. Microwave energy of frequencies which include the absorption band of the gas may be guided into the container by one path, and, after having undergone selective absorption at the gas resonance frequency, it may be withdrawn by another path. The microwaves may be introduced into the gas and withdrawn therefrom by way of suitable windows of a material such as mica which is transparent to microwave energy but confines the gas in that portion of the system in which it is intended that the absorption shall take place. The gas absorbs certain of the component frequencies present in the incident microwave energy, reducing the strength of these components in the outgoing wave. The resulting deficiency of the microwave energy of a particular frequency or frequencies may now be turned to account in various ways. For example, by balancing the wave which has been modified by passage through the gas against a wave which has not been so modified, and utilizing the energy difference, a pass-band of frequencies may be secured for the apparatus as a whole which coincides in frequency with the absorption band of the gas. Again, two such selective absorbers having different resonant frequencies may be coupled to the output of a microwave oscillation source and a signal may be derived from each which is related to the degree to which the source frequency departs from the resonant frequency. These two signals may then be differentially applied to a frequency-controlling electrode of the source, causing it to oscillate stably at a frequency intermediate between the two gas resonance frequencies.

The width of the resonance absorption band of the gas may be broadened or narrowed as desired by adjustment of the gas pressure. Thus the "Q" (quality factor) and so the sharpness of tuning may be controlled at will. The location of the resonance bands on the frequency scale may be altered in accordance with the Stark effect or the Zeeman effect, respectively, by the application of an auxiliary electric field or an auxiliary magnetic field in proper orientation with respect to the microwave field. By applying such auxiliary fields at signal frequencies, signal frequency modification of the microwave energy may be secured.

The absorption coefficient of many gases for microwaves of one frequency is dependent on the presence or absence of a microwave field of a different frequency. This permits the energy absorbed from incident microwave energy of a first frequency to be varied at will by irradiating the gas with microwave energy of a second frequency. Thus, in accordance with the invention in another aspect, amplitude modulation may be imparted to a microwave by passing it through a resonant gas, irradiating the gas by another microwave, for example in infra-red beam, and varying the irradiation under control of desired modulating signal.

The invention is not limited to the use of any particular gas or gases. Various gases exhibit resonance absorption effects at various frequencies, so that choice of the gas depends principally on the frequency range of interest. For similar effects at neighboring frequencies it may be advantageous to employ gases which are chemically alike but isotopically different; for example, ordinary ammonia ($N^{14}H_3$) and "heavy" ammonia ($N^{15}H_3$). The shape and volume of the gas container are dependent on the absorption coefficient of the gas selected. For example, to secure a given absorption loss with a gas of low absorption coefficient requires passage of the microwaves through a greater mass of the gas, and therefore requires a confining tube or guide of greater length, than is required for the same absorption with a gas of higher coefficient. Similarly, if a chamber is utilized in place of a guide, successive passes of the microwave energy through the same mass of gas being relied on for the requisite absorption, a greater number of passes, and therefore a higher reflection coefficient for the interior walls, is required for a gas whose absorption coefficient is low than for one whose absorption coefficient is high.

The invention in the foregoing aspect and in others subsidiary or related thereto will be fully apprehended from the following detailed description of preferred embodiments thereof, taken in connection with the appended drawings, in which.

Figures 1, 2:
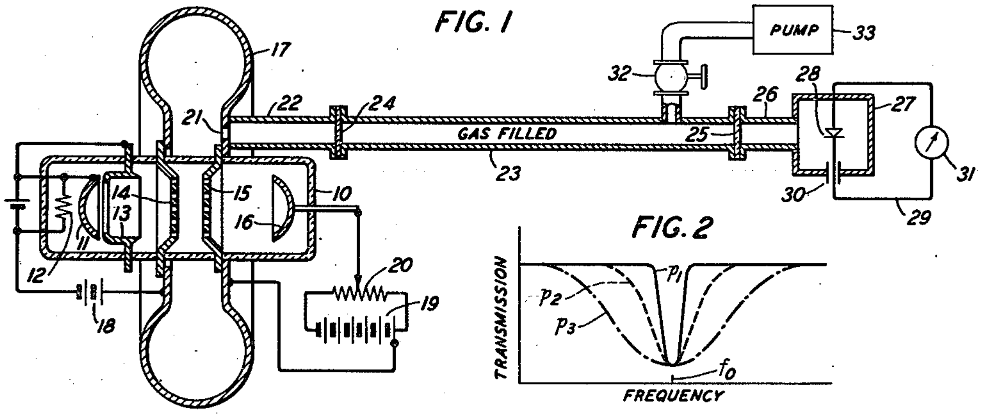
Fig. 1 is a schematic diagram of apparatus for indicating the selective absorption characteristic of a molecularly resonant gas as a function of gas pressure and frequency.
Fig. 2 is a plot of the transmission characteristic of a molecularly resonant gas as a function of frequency for different pressures.

Referring now to the drawings, there is shown in Fig. 1 an electron discharge device having an evacuated envelope 10 containing a cathode 11, a cathode heater 12, a collimator 13, a pair of high potential screens 14, 15 and a repeller electrode 16. The screens are supported by disc-shaped annuli passing entirely through the dielectric wall of the tube 10 and terminating in outwardly extending flanges against which the inner margins of a toroidal cavity resonator structure 17 are seated. With the screens 14, 15, and the repeller 16 polarized as by batteries 18, 19 the device operates as a repeller oscillator to produce oscillations of a frequency determined primarily by the configuration of the resonator structure 17, the velocity of the electrons in passing across the gap between the screens 14, 15 and the transit time elapsing between emergence of an outgoing electron from the gap and its return to the gap from the region of the repeller. That transit time is a function of the velocity with which the electrons emerge from the plane of the grid 15 in their course toward the repeller 16 and the potential difference between the grid 15 and the repeller 16. Consequently, variation of that potential difference affects the frequency of the oscillations produced by the oscillator. A tapped variable resistor 20 connected across the anode voltage source 19 permits ready adjustment of this potential difference and therefore of the oscillation frequency.

Any suitable ultra-high frequency generator of oscillations may be employed, one which is readily tunable being preferred. The repeller oscillator described above is selected only by way of illustration.

The oscillations produced by the oscillator build up an oscillation field within the resonator 17. Oscillation energy is supplied from the resonator 17 through an aperture or orifice coupler 21 to an output wave guide 22 having tubular conducting boundaries of any suitable cross-section, for example, circular or rectangular.

A gas-confining chamber 23 is coupled to the output wave guide 22, for example by way of a mica window 24 which permits passage of the electromagnetic energy in the wave guide into the gas chamber 23 and confines the gas within the chamber. The gas chamber may have various forms and is shown in the figure by way of illustration as being a substantial continuation of the wave guide 22, i. e., a tubular structure having the same cross-section as the output wave guide 22 and having conducting boundaries. The further end of the chamber 23 is similarly coupled by way of a mica window 25 to a terminal wave guide 26 which in turn is coupled to an output chamber 27 enclosing a microwave detector 28 with its pick-up connections. The detector may be of any preferred type but is preferably a point contact rectifying detector of the highly efficient silicon type. The detector has an output path for low frequency detected currents which pass through the insulated lead 29 which may be surrounded by a concentric by-pass capacitor 30. The output path is connected to a suitable load, here shown by way of illustration as a meter 31.

A material whose molecules are resonant at some frequency within the range of interest is introduced in the form of a gas into the chamber 23 by way of a valve 32 and its pressure is adjusted to a suitable value by means of a pump 33. The gas may be molecularly homogeneous or it may be a mixture of two or more gaseous substances. Choice of the gas or gases is dictated by various considerations, chief among which is the location on the frequency scale at which the resonant point or points is desired. The frequencies and magnitudes of the radio frequency resonances of a number of gases are given in various articles, e. g. in "Ammonia Spectrum and Line Shapes Near 1.25 Cm. Wavelength," by C. H. Townes, Phys. Rev. Vol. 70, p. 665, November 1946; and in "Rotational Spectra of Some Linear Molecules Near 1 Cm. Wavelength," by C. H. Townes, A. N. Holden and F. R. Merritt, Phys. Rev. Vol. 71, p. 64, January 1947.

Taking common ammonia as an example, this gas shows a number of resonances in the neighborhood of 24,000 megacycles per second, of which the strongest is at 23,870 megacycles per second. At atmospheric pressure the absorption bands are wide and overlap, but at lower pressures they appear as distinct bands. The absorption of microwave energy of 23,870 megacycles frequency by the strongest band is 0.2 decibel per foot of the single path wave guide chamber. The absorption is less at frequencies above and below the resonant frequency, so that substantial absorption takes place over a band of frequencies extending from below the resonant frequency to above it. The "half-width" of the band (full width of the band throughout which the absorption is at least one-half as great as the absorption at the resonant frequency) is about $10^{10}$ cycles per second at atmospheric pressure. The width of the absorption band depends on the pressure of the gas, and by reducing the gas pressure to $10^{-5}$ atmospheres a very sharp resonance curve whose half width is $10^5$ cycles per second may be obtained. This very narrow resonance band corresponds to a "Q" of about $3\times10^5$.

The area of the resonance curve is proportional to the total amount of absorption, which depends on the number of molecules excited by the microwave field. The number of excited molecules is proportional to the number present, and so to the pressure. Therefore as the pressure is reduced, the total absorption is diminished. At the same time, reduction of pressure is attended by an increase of the geometrical spacing between neighboring gas molecules and therefore by a diminution of the dynamical coupling between them, so that the absorption is concentrated more nearly at the mid-frequency of the absorption band. Experiment shows that these two effects are mutually compensatory, so that the absorption at the mid-frequency is to a good approximation independent of the pressure, while the band width is proportional to pressure.

As the potential of the repeller 16 is varied, thus varying the oscillation frequency of the source from a value below the molecular frequency to a value above it, it is found that the microwave energy absorbed by the gas increases to a maximum at the resonant frequency and then diminishes, while the energy transmitted through the gas to actuate the detector 28 and cause deflection of the meter 31 exhibits the opposite behavior; i. e., it falls to a minimum at the gas resonance frequency and then rises again to its original value.

This behavior is illustrated in Fig. 2, which shows a plot of the transmission characteristic of the gas under different conditions of pressure. The figure is idealized to the extent that only the major gas resonance is indicated, minor resonances being ignored. It will be apparent from examination of the figure that, at the very low pressures indicated by the curve $p_1$, substantially no absorption takes place except in the immediate neighborhood of the resonant frequency $f_0$, where the transmission curve shows a sharp dip downward, the lowest point being at the resonant frequency. As the pressure of the gas is increased the resonant behavior is more nearly depicted by the broader resonance curve $p_2$ and finally, as atmospheric pressure is approached by the still broader curve $p_3$. It will be observed that the peak absorption is the same for all three of the curves.

Figure 3:
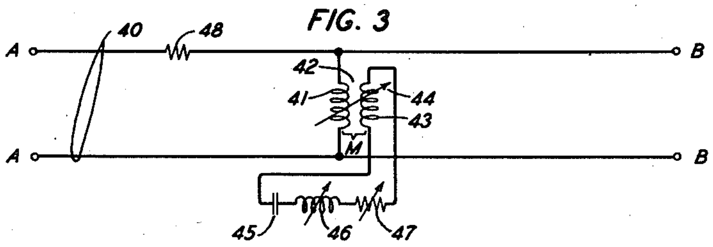
Fig. 3 is an electric circuit equivalent of a system comprising a resonant gas having a single absorption band.

An electric circuit approximately equivalent of a gas having a single absorption peak is shown in Fig. 3. Here the terminals AA are input terminals of a transmission line 40 and the terminals BB are the output terminals. The primary winding 41 of a transformer 42 is shunted across the transmission line. The coupling between the primary winding 41 and the secondary winding 43 is variable as indicated by an arrow 44. The secondary winding 43 is connected in series with a condenser 45, a variable inductance element 46 and a variable resistor 47. Variation of the resistor 47 which varies the "Q" and sharpness of tuning of the equivalent circuit, corresponds to varying the pressure of the gas. Variation of the variable inductance element 46 over a wide frequency range, thus changing the resonant frequency of the equivalent circuit, corresponds to substitution of one gas for another. A resistor 48 is interposed in the line between the input terminals AA and the network 41—47. At the frequency to which the network is resonant it absorbs energy. The voltage drop across the resistor 48 results in less energy being available at the output terminals BB, at resonance, than is supplied to the input terminals AA.

Figure 4:
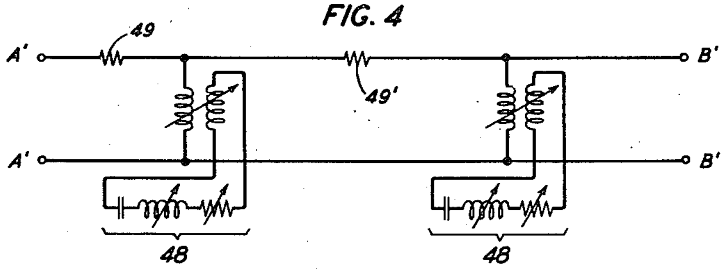
Fig. 4 is an electric circuit equivalent of a system comprising a resonant gas having two absorption bands.

Fig. 4 is an electric circuit equivalent of a resonant gas having two resonant absorption bands of approximately the same magnitude. Here the various parameters have the same effect as those described above in connection with Fig. 3, the difference being that the two networks 48, 48' are tuned to different frequencies and are not mutually coupled together. The behavior of this circuit equivalent is the same, for example, as that of a mixture of two different gases, each of which displays a single resonant absorption band, the two bands being centered at frequencies $f_1$ and $f_2$. Resistors 49, 49' are interposed to simulate the loss of energy, at resonance, between the input terminals A' A' and the output terminals B' B'.

Figure 5:
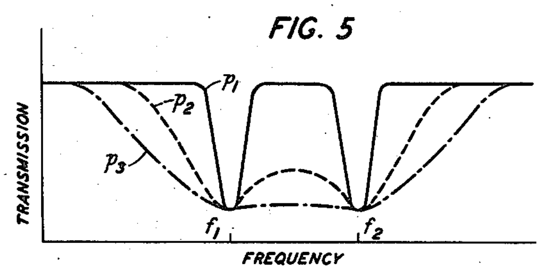
Fig. 5 is a plot of the transmission characteristic of a molecularly resonant gas having two neighboring absorption bands, as a function of frequency for different pressures.

Fig. 5 is a transmission characteristic of such a gas for three different values of gas pressure. As before, the sharpest resonance is obtained with the lowert pressure, and in the curve $p_1$ a substantial portion of the frequency scale intermediate the two absorption peaks shows no appreciable amount of absorption. As the pressure is increased to a value $p_2$, each of the narrow absorption bands becomes wider, so that this intermediate frequency region becomes merely a minor reduction of the absorption at the mean frequency as compared with the absorption at either of the frequencies $f_1$, $f_2$. As the pressure is still further increased to a value $p_3$, even this minor reduction disappears and the result is a single broad absorption band.

Figure 6:
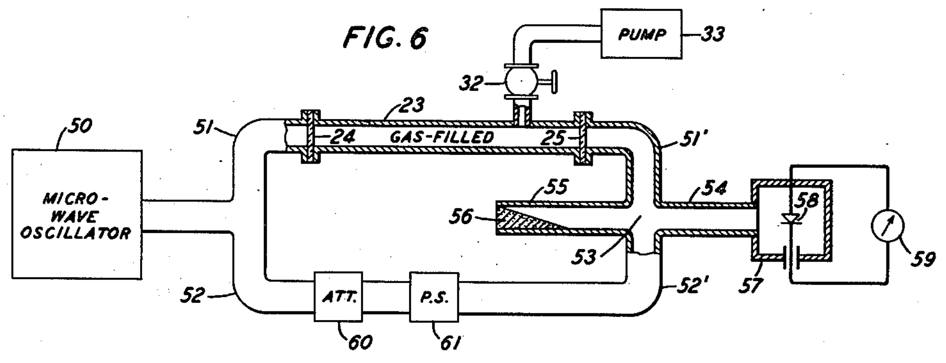
Fig. 6 is a schematic diagram of a microwave band-pass device, utilizing the molecular resonance of a gas.

For most practical purposes, a frequency pass band, broad or narrow, is preferable to an absorption band, and apparatus exhibiting the characteristics of a band-pass filter or series tuned circuit may be constructed in various ways, based upon the absorption characteristics of the gases. Fig. 6 is a schematic diagram of such a system. Here oscillations from a suitable microwave source 50 which may for example be an oscillator such as that of Fig. 1, are divided into two wave guide branches 51, 52 one of which, 51, contains a resonantly absorptive gas while the other, 52, does not. The gas may, as before, be confined between mica windows 24, 25 in a chamber 23 which, as before, may be continuous with the guide portions beyond the windows and the gas may be introduced by way of a valve 32 and adjusted in pressure by a pump 33 as before. These two branches are brought together by way of a hybrid wave guide connector or T 53 of the type described in an application of W. A. Tyrrell, Serial No. 581,285, filed March 6, 1945, Patent 2,445,895, July 27, 1948. This hybrid connector or T has four branches, three in the electric plane and one in the magnetic plane. The two incoming branches 51, 52 from the gas path and the gasless path, respectively, and the outgoing branch 54 are in the electric plane while the fourth magnetic plane branch 55 is terminated in any suitable absorbing device, for example, a wedge-shaped block 56 of absorbent material which may comprise carbon either bonded with a plastic material or coated on a ceramic material. With this construction the output guide branch 54 will carry energy proportional to the difference between energies in the two incoming branches 51', 52' while the terminated magnetic plane branch 55 will carry and dissipate energy proportional to their sum.

The output guide 54 is coupled to a chamber 57 enclosing a microwave detector 58 connected to any suitable load, here illustrated as a meter 59. The chamber, the detector and the meter may be similar to those described above in connection with Fig. 1.

Thus in the absence of gas resonances, the energies in the two branches 51, 52 balance and the output branch 54 carries no energy. As the frequency of the incoming energy from the source 50 is progressively changed, the resonant point of the gas is approached and the gas absorbs some of the energy in the gas-containing branch 51 so that this energy is no longer able to cancel the energy in the gasless branch. The energy difference, now no longer zero, is propagated by way of the output guide 54 into the chamber 57 to affect the detector 58. Evidently such a system exhibits a behavior depicted in Fig. 7. That is to say, the transmission of the apparatus as a whole is very small except in the neighborhood of the pass band of the apparatus which corresponds exactly to the absorption band of the gas. Evidently, further, the width of the pass band of the apparatus may be adjusted by changing the pressure of the gas which changes the width of the absorption band of the gas. Thus, as pressure is progressively increased, the apparatus of Fig. 6 will exhibit, in succession, behaviors which are indicated by curves $p_1$, $p_2$ and $p_3$ of Fig. 7.

To insure optimum balance of the energy in the two paths 51, 52 in the absence of a gas resonance, an attenuator 60 and a phase shifter 61, which may be of any desired type, may advantageously be inserted in the gasless path 52. These may be adjusted, in the absence of a gas resonance, until the reading of the meter 59 is a minimum.

Figure 8:
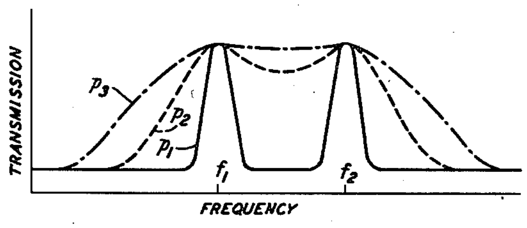
Fig. 8 is a plot of the transmission characteristic of the apparatus of Fig. 6 with a gas having two neighboring absorption bands.

If now, the single-absorption-band gas in the chamber 23 of Fig. 6 be replaced by a gas having two absorption bands, or with a mixture of two gases each of which has one absorption band, the transmission of the gas will be as shown in Fig. 5 and the transmission of the apparatus as a whole will be as shown in Fig. 8, each of the low-pressure absorption bands of the gas reappearing as a low-pressure pass band of the apparatus. By increasing the pressure, these pass bands may be caused to broaden out until they overlap, thus giving the transmission curve $p_3$ of Fig. 8. From this it may be seen that the apparatus as a whole displays the characteristic of a broad band-pass filter.

Figure 9:
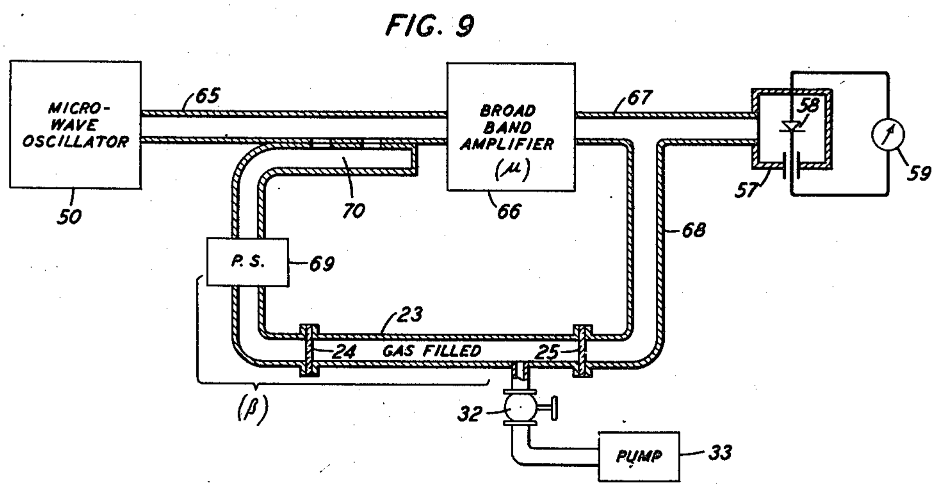
Fig. 9 is a schematic diagram of a microwave band-pass device alternative to Fig. 6.

Fig. 9 shows an alternative arrangement to that of Fig. 6 in which the characteristics of a feedback amplifier are taken advantage of. The incoming energy, for example from an oscillator 50 such as that of Fig. 1, enters the system by way of a guide 65 which is coupled to an amplifier 66 whose band width is preferably substantially greater than the absorption band or bands of the gas or gases to be employed. The output of the amplifier is led by a guide 67 to a chamber 57 enclosing a detector 58 connected to a meter 59 or other load as before. From the output guide 67 a feedback path guide 68 is coupled, forming a path for feedback energy from the output of the amplifier to its input. A gas chamber 23, defined by mica windows 24, 25 as before, and containing a suitable gas, is connected in series in this path. Following the gas chamber a phase shifter 69 is inserted. The feedback guide is coupled to the input guide 65 by way of a directional coupler 70 which may be of the type described in an application of W. W. Mumford, Serial No. 540,252, filed June 14, 1944, Patent 2,562,281, July 31, 1951. This device permits passage of the energy in the feedback guide 68 into the input guide 65 but prevents its passage in the reverse direction. As before, the gas may be inserted into the gas chamber 23 by way of a valve 32 and adjusted as to pressure by means of a pump 33.

It is known in the art of feedback amplifiers that the behavior of such a system may be represented by the expression:

$$E=\frac{\mu e}{1-\mu\beta}$$

where E is the output voltage, $e$ is the input voltage, $\mu$ is the transmission of the amplifier itself and $\beta$ is the transmission of the feedback path. In general, both $\mu$ and $\beta$ are complex numbers and functions of frequency.

When the product $\mu\beta$ is large compared with unity, as can be seen by making this substitution in the equation, the transmission of the system as a whole is substantially equal to $1/\beta$. Since (Fig 2) the transmission $\beta$ of the gas is less at the gas resonant frequency than at other frequencies, the transmission of the system as a whole is correspondingly greater. Coincidence in phase between the input energy and the feedback energy is assured by correct adjustment of the phase shifter 69. The system is in effect a narrow band-pass filter.

Figure 10:
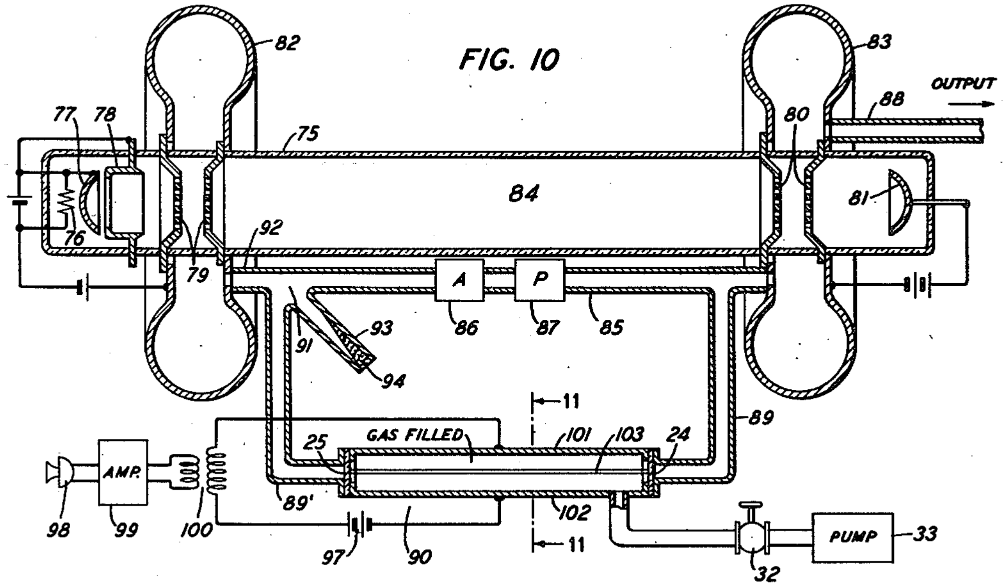
Fig. 10 is a schematic diagram of a microwave oscillation source whose frequency is stabilized at the resonant frequency of a molecularly resonant gas which, in turn, is varied under control of a signal to produce a frequency-modulated output.

Fig. 10 illustrates the application of the invention to the stabilization of the frequency of an oscillation source at the frequency of resonance of a gas. The oscillator to be stabilized may take various forms and is here shown, by way of illustration, as comprising a dielectric envelope 75 containing a heater element 76, a cathode 77, a collimator 78, two grids or screens 79, 79 defining an input gap, two grids or screens 80, 80 defining an output gap, and a collector electrode 81. The input gap screens 79 are connected to an input toroidal resonator 82 and the output gap screens 80 are connected to an output toroidal resonator 83. The input gap and the output gap are separated by a drift space 84. As is well known, a device of this character may be set into a state of self-oscillation by feeding back a portion of the energy in the output resonator 83 to the input resonator 82 for example, by way of a wave guide 85. The frequency of the oscillations is dependent on the design of the resonators 82, 83 and the characteristics of the feedback path, which preferably includes an attenuator 86 and a phase shifter 87.

Energy may be withdrawn from the output resonator as by a wave guide 88 coupled thereto.

In accordance with the invention, the frequency of the oscillations of the device is stabilized at the gas resonance frquency by connecting, in parallel with the feedback path, a second feedback path 89 which contains the gas chamber 90. These two parallel paths may be brought together by way of a hybrid T 91, of which the outgoing electric plane arm 92 is coupled to the input resonator 82 while the magnetic plane arm 93 is terminated in an absorber 94 as in the case of Fig. 6. The gas chamber 90 may be of the type heretofore described, being electrically continuous with the guides 89, 89' which supply energy thereto and withdraw it therefrom, the gas being contained in the intended location by mica windows 24, 25. If preferred, it may be of enlarged cross-section as compared with the feeding guide in which case reflection takes place at either end so that standing waves are set up in the gas chamber. This permits considerable reduction in the length of the gas chamber for a given amount of gas absorption.

As before, gas may be introduced by way of a valve 32 and its pressure adjusted by means of a pump 33.

As explained above in connection with Fig. 6 the sum of the energies arriving at the junction point by way of the two paths 85, 89 enters the shunt or magnetic plane arm 93 of the hybrid T 91 and is dissipated in the attenuator 94 which, as before, may be a wedge-shaped block of material containing carbon, or the like. The difference between these two energies passes into the output arm 92 of the T. When the attenuator 86 and phase shifter 87 in the principal branch of the feedback path are properly adjusted, no energy will be propagated from the output resonator 83 to the input resonator 82 except at frequencies at which the gas manifests a resonant absorption; in which case the feedback by way of the gas-containing path 89 will be reduced as compared with the feedback by way of the gasless path 85, so that energy of this frequency will be fed back from the output resonator to the input resonator, thus causing oscillations to be sustained at that frequency and at no other. This frequency is indicated by the peak of the transmission curve $E_0$ of the device as a whole, namely the frequency $f_0$ of Fig. 12.

By the proper application of an auxiliary electric or magnetic field to the gas, its resonant absorption band may be split into two or more separate absorption bands, of which one is somewhat lower and another somewhat higher on the frequency scale than the original band. Splitting of the absorption band of the gas results in splitting of the pass band of the feedback bridge circuit and therefore of the apparatus as a whole. This is illustrated in Fig. 12, wherein the curve $E_0$ indicates the pass band of the apparatus before the application of the auxiliary field and the curve $E_1$ indicates the pass band after the application of such an auxiliary field.

Figure 11:
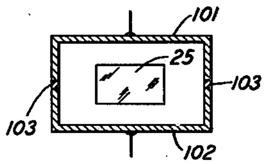
Fig. 11 is a cross-section of the gas container of Fig. 10, taken on the section 11—11.

In the figure, the auxiliary field is indicated as being applied in a direction parallel with the plane of the drawing, i. e., perpendicular to the direction of propagation and parallel with the electric vector of the microwaves. It is derived from a bias source such as a battery 97 supplemented by a signal source, for example, a source of voice frequency energy as derived from a microphone 98 and associated amplifier 99 and transformer 100. These two sources are coupled in series and to the upper and lower conductive boundaries 101, 102 respectively, of the gas-containing chamber 90. These boundaries may be insulated from the remainder of the system by means of the mica windows 24, 25. The upper bounding plate may likewise be insulated from the lower bounding plate by solid dielectric blocking condensers 103 as indicated in Fig. 11.

Figure 12:
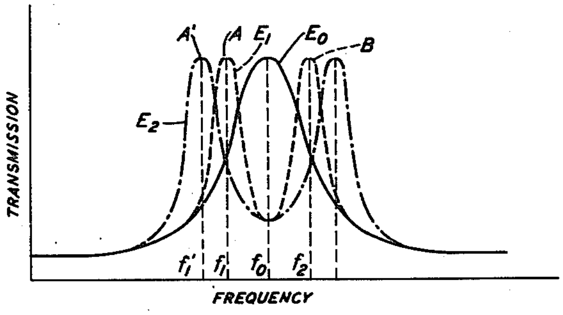
Fig. 12 is a diagram illustrating the operation of the apparatus of Fig. 10.

When only the voltage of the steady bias source 97 is applied, oscillations will take place either at the point A or the point B of the second curve of Fig. 12. If the resonant frequency is approached from below, they will take place at the point A and be of frequency $f_1$. If resonance is approached from above they will take place at frequency $f_2$. Assuming that the oscillations take place at the frequency $f_1$, then, when the auxiliary field is increased and reduced by the application of the signal frequency source, the oscillation frequency will shift from the frequency $f_1$ to the frequency $f_1'$, lying on the transmission curve $E_2$ whose peak is at the point A', for a different value of the applied auxiliary field. Inasmuch as the magnitude of the auxiliary field is altered in accordance with a signal frequency derived from the signal frequency source 98, so also is the frequency of self-oscillation of the oscillator system as a whole varied in accordance with the signal frequency of this source 98. As a result, there are obtained stabilized ultra-high frequency oscillations, the frequency of which is modulated in accordance with a signal.

Figure 13:
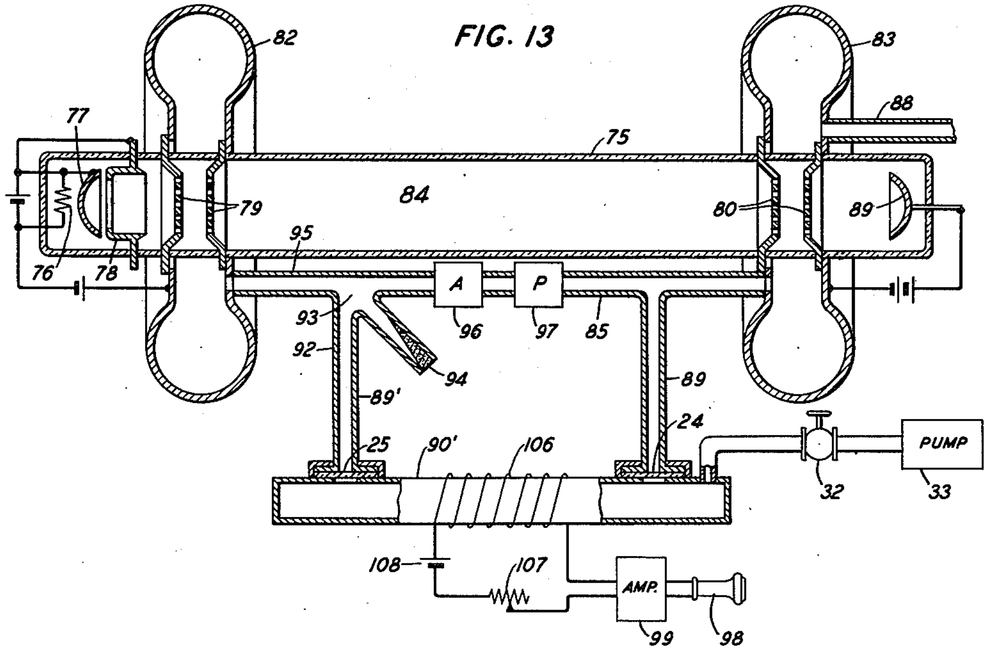
Fig. 13 is a schematic diagram of a signal frequency-modulated gas-stabilized oscillator source alternative to that of Fig. 10.

Fig. 13 shows an alternative arrangement of the stabilized frequency-modulated oscillation source of Fig. 10, the difference being that the auxiliary field is applied magnetically instead of electrically. The oscillator with its various electrodes, resonant chambers and feedback bridge paths may be substantially the same as that described above in connection with Fig. 10 with the exception that the gas chamber 90' may be surrounded with a coil 106 and the blocking condensers 103 of Fig. 10 may be omitted. For convenience, a variable resistor 107 is shown connected in series with the bias source 108 and the signal frequency source 98 for varying the magnitude of the direct current which flows through the coil 106 and which determines the amount of splitting of the gas resonance absorption band and therefore the frequency of self-oscillation of the device as a whole.

Figures 14, 15, 17, 18:
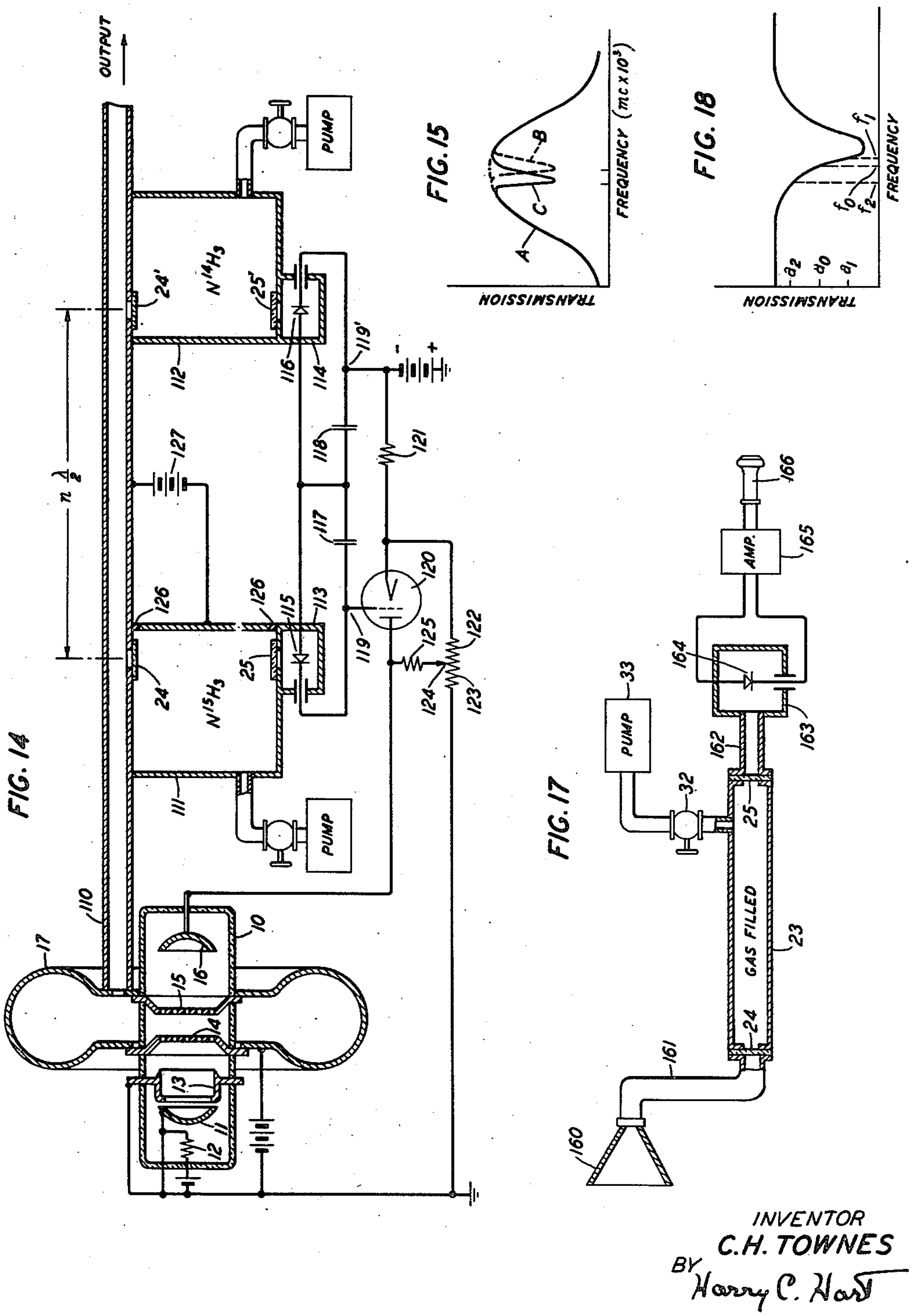
Fig. 14 is a schematic diagram of a frequency-stabilized oscillator of the so-called "crossed resonance curve" type utilizing the resonance absorption characteristics of two different gases.
Fig. 15 is a diagram illustrating the operation of the apparatus of Fig. 14.
Fig. 17 is a schematic diagram of apparatus for demodulating a received frequency-modulated wave.
Fig. 18 is a diagram illustrating the operation of the apparatus of Fig. 17.

Fig. 14 illustrates the application of the invention to the stabilization of an oscillation source in accordance with a somewhat different principle of operation. In this figure the oscillator to be stabilized is taken for the sake of illustration as being similar to that shown in Fig. 1 and discussed above. Output energy may be supplied from the resonator 17 by way of a wave guide 110 having tubular conducting boundaries to a desired load. A discriminator system for stabilizing the frequency of the oscillations supplied to the wave guide 110 includes as its initial element two resonant gas chambers 111, 112 coupled to the wave guide by mica windows 24, 24' which are spaced apart a distance of $$\frac{n\lambda_g}{2}$$

where $n$ represents any integer and $\lambda_g$ is the wavelength of the stabilized frequency of the microwave as measured along the guide 110. The first resonator 111 is tuned to a frequency slightly lower than the stabilized frequency and the second resonator 112 is tuned to a frequency slightly higher. This tuning to two different frequencies has in prior systems been secured by adjustment of the chamber dimensions. In accordance with the invention it may conveniently be secured by the use of two different gases having absorption coefficients which are substantially alike, for example, two gases which are chemically alike but isotopically different such as, for example, ordinary ammonia and heavy ammonia. The ordinary ammonia ($N^{14}H_3$) has a strong resonance at a frequency of 23,870 megacycles. The heavy ammonia ($N^{15}H_3$) has a strong resonance at a frequency of 23,925 megacycles. That is, the resonant frequencies of the two different isotopes of ammonia differ by about 55 megacycles. Thus this pair of gases is a suitable one for use in a system such as that shown in Fig. 11, wherein the oscillator is to be stabilized at approximately 23,900 megacycles.

These two resonators which constitute the selective portion of the microwave discriminator are provided with output chambers to which they are respectively coupled by mica windows 25, 25', and each output chamber encloses a microwave detector with its pick-up connections. The detectors 115, 116 and output chambers may be as described in connection with Fig. 1 or of any other suitable type. The output paths of the detectors are connected to two condensers 117 and 118 in series-opposing relationship to produce between the points 119 and 119' a unidirectional potential, the polarity of which depends upon which one of the two resonators 111 and 112 is more nearly in tune with the instantaneous frequency of the generated oscillations as they appear in the microwave guide 110 so as to receive a predominant share of its energy. The magnitude of the unidirectional potential depends upon the difference in magnitude of the individual unidirectional potentials across the capacitors 117 and 118.

The net unidirectional potential between points 118 and 119 is applied to the grid-cathode circuit of a direct current amplifier 120. As illustrated, a source of, for example, 300 volts electromotive force, supplies current through a series path including resistor 121 and the portions 122, 123 of a potentiometer 124. The potential difference across resistor 122 is effective to produce space currents between cathode and the anode of the direct amplifier 120 its magnitude being controllable by variation of the position of the movable tap of the potentiometer 124. Variations in the applied unidirectional grid electromotive force will cause corresponding variations in the space current of the direct current amplifier 120. These variations in the current cause similar variations in the potential drop across the load resistance 125. The net electromotive force applied to the repeller electrode 16 of the oscillator tube is the difference between the potential drop across arm 123 of the potentiometer and that across the load resistance 125. Thus variations in the potential of the grid of the amplifier 120 will result in amplified variations in the electromotive force impressed on the repeller electrode 116. The function of potentiometer 124 is to adjust the repeller potential to an optimum value for the condition of no potential difference between the points 119, and 119'. In this condition normal bias is applied to the grid of the tube 120 by virtue of the potential drop in the bias resistor 121.

The windows 24, 24' which couple the wave guide 110 to the resonant gas chambers 111, 112 while an integral number of half wavelengths apart, are not so widely separated as to preclude the balancing out of differences in field strength or casual phase variations or other effects which may not readily be balanced out. In other words, the relative locations of these apertures should be such that changes in the standing waves in the wave guide, other than those attending changes in the oscillator frequency, will affect both of the resonant gas chambers in identical fashion.

It will be apparent that as the frequency of the microwaves supplied by the repeller oscillator to the guide 110 varies, the resonant gas chambers 111, 112 will give responses which may be represented by the solid and broken line curves of Fig. 15. The direct current electromotive force between the points 119 and 119' is determined by the difference between the two responses. The unidirectional potential across the resistor 125 and the potential of the repeller electrode 16 as well will vary in magnitude and polarity as has been explained. As the oscillation frequency tends to fall below the desired frequency, the potential drop across the resistor 125 will vary in such a direction as to cause the repeller potential to tend to increase the frequency. An opposite effect is had when the frequency of the oscillations supplied to the wave guide 110 tends to rise above the desired frequency. Consequently, the repeller oscillator is highly stabilized with respect to frequency.

In Fig. 15 which represents the performance of the discriminator, the curve A is the resonance curve of either or both of the chambers 111, 112 in the absence of the resonant gas. The curve B is the transmission curve of the high frequency gas, for example ordinary ammonia, and the curve C is the transmission curve of the lower frequency gas, for example heavy ammonia. The gas chambers should be designed, in accordance with principles which are well known, to be somewhat broadly tuned as compared with the sharp tuning of the gases. In the case of each of the resonant gas chambers, the energy ultimately transferred to the detector is dependent on the strength of the electromagnetic field built up by oscillations within the chamber and as thereafter reduced by the gas absorption. For this reason, the transmission curve of each of the gases appears as a sharp dip downward at or close to the peak of the broader resonance curve of the gasless chamber.

Except for the employment, in this combination, of resonant gases in place of tuned elements of other types, the system of Fig. 14 is substantially that described in an application of J. P. Kinzer, Serial No. 678,212, filed June 21, 1946, Patent 2,593,463, of April 22, 1952, Case 8.

As hereinabove stated with respect to other modifications a long wave guide in which standing waves are not built up may, if desired, be substituted for each of the resonant chambers 111, 112 in which case the discriminator characteristic would not contain the broad peak of curve A of Fig. 15.

Instead of gases in the two chambers which differ chemically or isotopically, identical gases may be employed, the resonant absorption frequency of the one being shifted as compared with the other by the application of an auxiliary electric or magnetic field. To this end one wall of the chamber 111 is shown coupled to the other walls by way of blocking condensers 126 and a potential source 127 is connected between this wall and the guide 110. The resulting auxiliary electric field in the chamber 111, by its action on the gas within it, results in a splitting of the absorption band into at least two parts, one higher, the other lower in frequency than the absorption band of the gas in the other chamber. With this arrangement there are two frequencies at which the rectifier outputs are alike. The first is between the lower band of the gas in the chamber 111 and that in the chamber 112 while the second is between the band of the gas in the chamber 112 and the upper band of the gas in the chamber 111. Oscillations will be stabilized at one or the other of these frequencies depending on the direction of variation of the voltage controlling the oscillator frequency.

Another type of frequency discriminator circuit, widely used at lower frequencies, operates on the principle of separately rectifying the sum and the difference of two voltages which differ in phase by 90 degrees at the nominal or mean frequency of the system. By the use of a frequency-responsive circuit, such as a circuit resonant at the nominal frequency, one of these component voltages is caused to vary in phase as the frequency departs from the nominal value. Accordingly, the differential combination of the rectified voltages will be a voltage varying in magnitude and polarity with deviations of the input from the nominal frequency. Such circuits have in the past been built up of circuit elements of lumped constants, which is not practical for operation in the microwave range. Application Serial No. 670,384, filed May 17, 1946, Patent 2,691,734, October 12, 1954, describes and claims a system operating in accordance with this principle and having circuit elements of the distributed constant type, which are suitable for operation at high frequencies.

Figure 16:
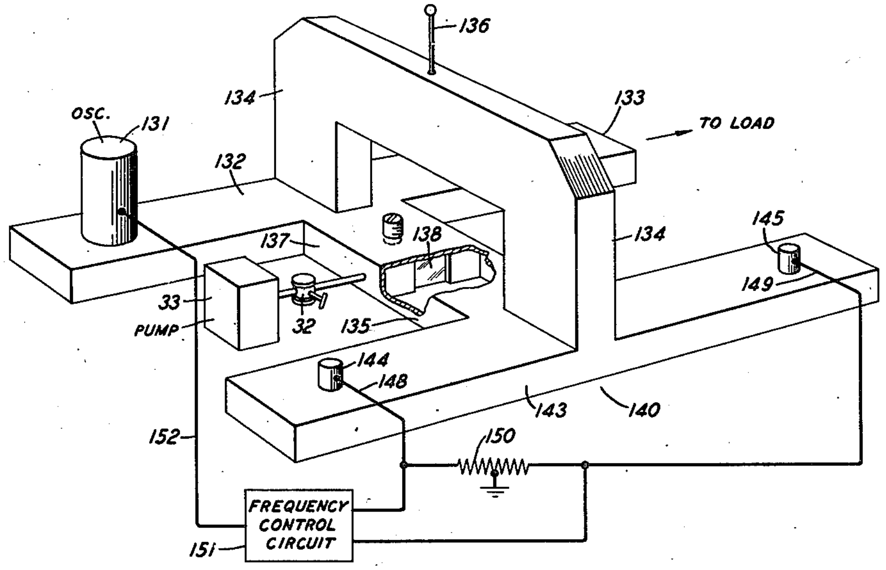
Fig. 16 is a schematic diagram of a frequency-stabilized oscillator utilizing the phase characteristic of a molecularly resonant gas.

In accordance with the present invention a resonant gas may advantageously be employed as a tuning element in such a system because, as with resonant systems of other types, the selective absorption characteristic is associated with a phase-frequency characteristic, and the sharper the selective absorption band, the steeper is the phase characteristic. Fig. 16 shows a system in which the phase characteristic is turned to account. Thus, the microwave oscillator tube 131 which may be of the repeller electrode type described above in connection with Fig. 1 feeds the main wave guide 132 of rectangular cross-section. The feed may be by means of a probe extending into the guide through an orifice in the upper face which is wider than the vertical faces of the guide. This produces in the guide dominant waves in which the lines of electric intensity are parallel to the narrower faces of the guide. The right-hand end 133 of the guide is intended for feeding to a load circuit (not shown).

At a suitable point along the main wave guide 132 branch wave guides 134 and 135 supply waves to a hybrid wave guide junction or T 140 which may be of the type described above in connection with Fig. 6. The hybrid junction 140 comprises a main wave guide 143 and the branch wave guides 134 and 135 so relatively disposed that their longitudinal axes extend in mutually perpendicular planes, the branches 134 and 135 connecting to the main guide 143 at its center. The wider faces of the guide 134 are normal to the direction in which the main guide 143 extends and the narrower faces of the guide 134 are parallel to that direction. This is a connection in the electric plane, i. e., the plane parallel to the lines of electric intensity produced in the guides when dominant waves are propagated towards the junction 140 and is equivalent to a series electrical connection. The narrower faces of the branch guide 135 are normal to the direction in which the main guide 143 extends and the wider faces of guide 135 are parallel thereto. This is a connection in the magnetic plane, i. e., the plane perpendicular to the plane of electric intensity, and is equivalent to a shunt or parallel electrical connection.

The two portions of the main wave guide 143 extending on opposite sides of the common junction 140 with the branch wave guides 134 and 135 are of equal length and are closed at their outer ends by reflecting plates. Point contact crystal rectifiers 144 and 145 are mounted in the wave guide 143 at such distances from the closed ends as to provide an effective impedance match. The arrangement for mounting the rectifiers 144 and 145 may be that shown in the copending application of W. M. Sharpless, Serial No. 578,030, filed February 15, 1945, which issued as United States Patent Number 2,438,521, March 30, 1948, or it may be similar to that described above in connection with Fig. 1. The rectified outputs from the crystal rectifiers 144 and 145 are taken off through the connections 148 and 149 and applied to a resistor 150 which is grounded at its midpoint.

The branch wave guides 134 and 135 supplying output waves of the oscillator 131 in the main wave guide 132 to the hybrid T 140 are arranged so that they have a difference in length equal to an odd integral multiple of a quarter wavelength of the output waves from the oscillator 131 at its normal frequency. In this way inputs from the guides 134 and 135 to the wave guide junction 140 are caused to be in phase quadrature. In order to maintain this quadrature relation there is provided in the branch guide 134 a wave guide phase shifter having an adjusting handle 136. This phase shifter may for example be of the type shown in the copending application of D. H. Ring, Serial No. 640,495, filed January 11, 1946, corresponding British Patent 641,227 of August 29, 1950. The phase shifter permits adjustments to take care of manufacturing variations in the wave guides or minor changes in the nominal frequency of the oscillator.

The wave guide branch 135 includes a gas chamber 137 containing a resonant gas and provided at each end with mica windows 138 for retaining the gas and passing the wave energy to other parts of the wave guide system. The output window 138 is shown at the broken section of the walls of the guide 135. The gas may be admitted by way of a valve 32 and its pressure may be adjusted by a pump 33.

The branch wave guides 134 and 135 are coupled to the main guide 132 by small irises adjusted to extract only a small portion of the energy from the guide 132 and are matched to the main guide 143 of the hybrid junction 140 by means of irises (not shown) or by the use of an impedance matching system such as that shown in an application of C. F. Edwards, Serial No. 637,124, filed December 24, 1945, Patent 2,679,582 of December 24, 1945. In this way impedance irregularities at the junction points are avoided.

The terminals of a resistor 150 are connected to the input of the frequency control circuit 151 whose output is led through the connection 152 to the oscillator 131 to regulate its frequency. This frequency control circuit 151 may include a direct current amplifier and the amplified direct current output voltage may be applied through the connection 152 to the repeller electrode of the oscillator 131 and the frequency of its output thus controlled in the manner hereinabove described. Instead of using a purely electrical control, it may be found preferable in some applications to employ a mechanical link. In such cases the control circuit 151 would comprise one of the types of servomechanical systems known in the art.

In the operation of the system waves supplied by the oscillator 131 through the branch wave guide 134 to the main guide 143 of the hybrid T 140 produce voltages of opposite phase in the rectifiers 144 and 145. On the other hand the voltages produced in the rectifiers 144 and 145 by waves from the branch wave guide 135 are of like phase. Now, at the nominal frequency of the oscillator 131 to which the resonant gas in the chamber 137 is tuned the waves introduced into the wave guide 143 by the respective wave guides 134 and 135 are in phase quadrature. As a result the respective voltages produced by the rectifiers 144, 145 each of which is proportional to the vector sum of voltages impressed on it, will be equal, and the voltage produced across the resistor 150 will be zero. On the other hand if the frequency of the waves generated by the oscillator 131 varies from the resonant frequency of the gas in the chamber 7, the phase of the voltages across the rectifiers 144 and 145 due to waves from the branch guide 135 will depart from the quadrature relation to the voltages due to waves from the guide 134 and the direction of the phase departure will depend upon whether the frequency decreases or increases. As a result the voltage produced across one of the rectifiers will increase and that produced across the other will decrease. Accordingly there will be produced across the resistor 150 a voltage of one sign for variations in the frequency of the oscillator 131 in one direction and a voltage of the opposite sign for frequency variations in the opposite direction. This is analogous to the operation of well-known frequency discriminator of the lumped circuit type.

The voltage developed across the resistor 150 after amplification in the direct current amplifier 151 is employed to regulate the frequency of the oscillator 131. Thus no voltage is available in the connection 152 when the oscillator is operating at the proper frequency, that is the resonant frequency of the gas in the chamber 137. However, when the frequency of the output of the oscillator 131 varies in either direction from that value a voltage of the proper sign to cause a correction in the desired sense is applied through the connection 152 to the repeller electrode of the oscillator.

The principles of the invention may be applied to the demodulation of received frequency-modulated microwaves in various ways, a particularly simple and direct one being illustrated in Fig. 17. Here the microwaves are received, for example by a horn-antenna 160 and, with or without amplification by appropriate means, not shown, they are applied by way of a coupling guide 161 and a mica window 24 to a gas chamber 23. After selective absorption by the gas within the chamber has taken place in the manner heretofore described, the residual microwave energy emerges by way of a mica window 25 and is guided by an output guide 162 to a chamber 163 enclosing a detector 164, each of which may be substantially as described in connection with Fig. 1. The detector output current, after amplification as by an amplifier 165 is then applied to a suitable reproducer, here shown by way of example as a telephone receiver 166.

The gas is to be so selected in relation to the received waves that the frequency of the microwave carrier lies approximately midway along the sloping portion of the gas absorption curve, as indicated in Fig. 18. The gas pressure may be adjusted in the manner heretofore described by the valve 32 and the pump 33 to give to the resonance curve a breadth such that the widest frequency swing due to full modulation of the microwave carrier shifts the instantaneous frequency approximately between the frequency $f_1$ and the frequency $f_2$ as shown in Fig. 18. Evidently the detected output and consequently the signal delivered by the reproducer 166 will vary in strength between the values $a_1$ and $a_2$ of Fig. 18, and so with the frequency of the received microwave energy.

Figure 7:
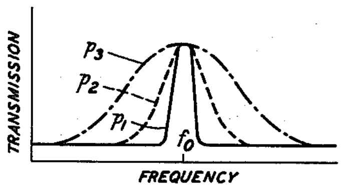
Fig. 7 is a plot of the transmission characteristic of the apparatus of Fig. 6 with a gas having a single absorption band.

If a more direct relation between the frequency of the received signal and the detected signal strength is required, a bridge arrangement such as that of Fig. 6 may be employed which, as explained above, gives rise to a system transmission curve similar to the curve $p_2$ of Fig. 7.

The absorption by a gas of microwave energy of one frequency may be modified in amount by irradiating the gas with microwaves of another frequency. Thus, for example, the absorption at low pressures by ordinary ammonia gas of microwave energy of the frequency 23,870 megacycles is about 0.2 decibel per foot of length of the gas chamber, for a single energy pass. When, however, the gas is irradiated by infra-red radiation, the absorption of the 23,870-megacycle microwave is considerably reduced. In the case of other gases or other frequencies the effect may be an increase of absorption. Whether it be a reduction or an increase depends in a complicated fashion on the various characteristics of the particular molecule in question and the frequency of the disturbing radiation. In general, however, there can be a marked alteration in the absorption of microwaves of a first frequency at resonance in the presence of microwave energy of a second frequency.

Figure 19:
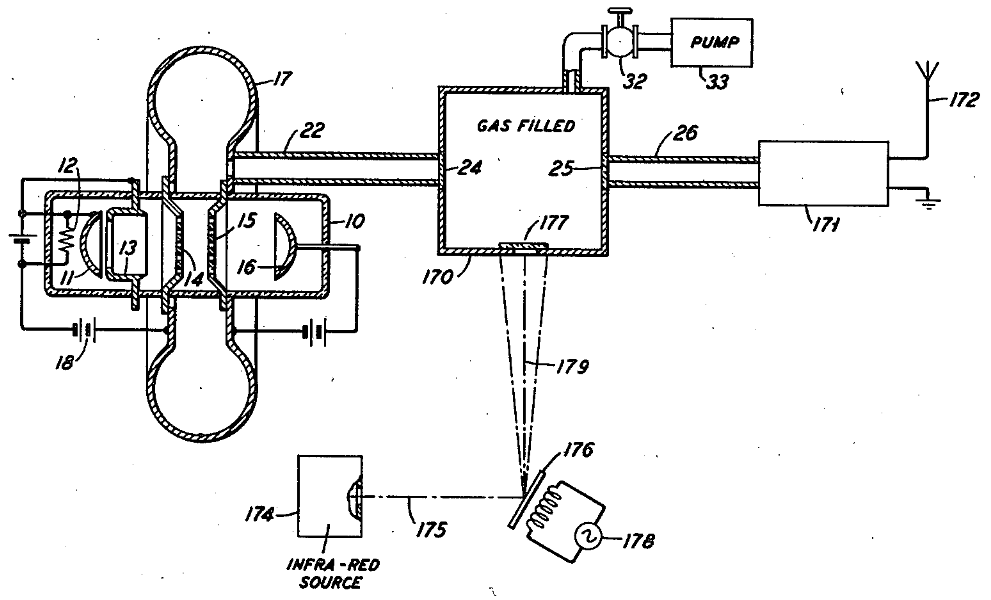
Fig. 19 is a schematic diagram of apparatus for amplitude-modulating the output of a microwave source, utilizing the molecular resonance of a gas and the action of infra-red radiation on such resonance.

In accordance with the invention, this phenomenon is turned to account to provide amplitude modulation of microwave energy. Various methods may be employed to produce the necessary molecular interaction between the two frequencies and the apparatus may take various forms. Apparatus of one such form is depicted in Fig. 19, wherein a microwave oscillation source 10 which may be similar to that hereinabove described in connection with Fig. 1 or of any desired variety, delivers energy from its resonant cavity 17 to a gas-containing chamber 170 by way of a wave guide 22. The frequency of this energy should be substantially equal to the frequency at which the gas is resonant; e. g., if the gas is ordinary ammonia the frequency should be 24,000 megacycles (more precisely, 23,870 megacycles) and the oscillation source 10 should be tuned to this frequency and stabilized thereat.

The resonant gas chamber 170 may be provided with a mica window 24 at the point at which the input wave guide 22 is coupled to it and with a window 25 at the point to which an output wave guide 26, leading to an amplifier 171 and a load circuit, e. g., an antenna 172, is coupled to it. As before, the gas may be introduced by way of a valve 32 and its pressure adjusted by means of a pump 33. The chamber 170 may be of the wave guide type hereinabove discussed but it is shown here, by way of example only, as a chamber of more nearly like dimensions. Its dimensions should be selected so that its resonant frequency, regarded as a tuned cavity, coincides with the resonant frequency of the gas, and its tuning should preferably be substantially broader than the resonant absorption band of the gas.

An infra-red radiation source 174, for example, an electrically heated platinum ribbon or a caesium vapor lamp, is provided, whose rays 175 may be reflected on a suitable mirror, for example a polished copper surface, to enter the gas chamber by way of a window 177 which is transparent to radiation of the frequency in question, for example a window of silver chloride. The mirror may be caused to vibrate in accordance with a signal, being mounted, for example, in the familiar manner of a galvanometer element, the oscillating signal being derived from an audio frequency source 178. Thus the reflected beam 179 will be caused to swing on and off the silver chloride window 177 in relation to the signal, and infra-red radiation will enter the gas chamber 170 by way of the silver chloride window in greater or lesser amount in dependence on the amplitude of the audio frequency signal.

When the infra-red beam is deflected past the silver chloride window 177 so that none of it enters the gas chamber 170, the resonant absorption of the ammonia gas to the microwave energy of 24,000 megacycles has its full value of 0.2 decibel per foot of passage through the gas. When the reflected infra-red beam 179 is centered on the window 177 this absorption is reduced. Thus the microwave energy passing through the chamber 170 and into the output wave guide 26 is alternately increased and reduced in accordance with the signal of the source 178; i. e., amplitude modulation of the microwaves of the source 10 through the medium of a resonant gas is provided.

Figure 20:
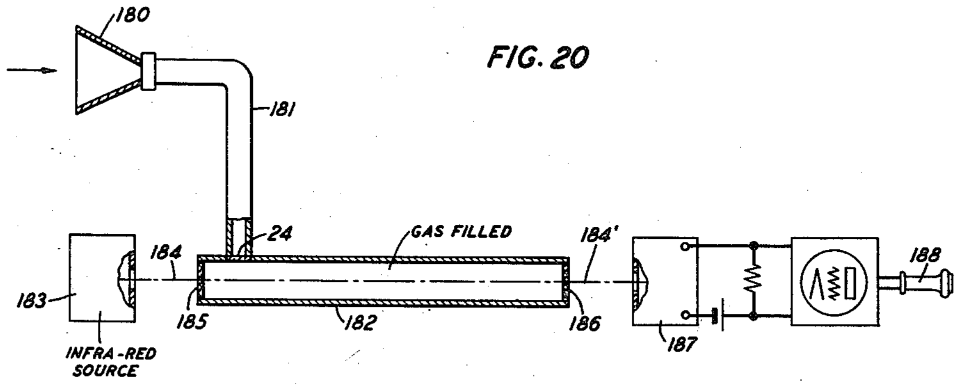
Fig. 20 is a schematic diagram of apparatus for demodulating a received amplitude-modulated wave.

Fig. 20 shows a system for demodulating microwave energy which may be received, for example, after radio transmission, and which bears a desired signal in the form of amplitude modulation. The incoming amplitude-modulated microwaves may be picked up by an antenna 180 and supplied by way of a wave guide 181 and a mica window 24 into a resonant gas chamber 182 as before. An infra-red radiation source 183 is provided in a position such that its rays 184 shine directly into the gas chamber 182 by way of a suitable window 185, for example of silver chloride. At the far end of the chamber 182 another silver chloride window 186 is provided through which emerges the infra-red radiation 184' which has not been absorbed by the gas in the chamber 182. The amount of absorption of infra-red radiation is dependent on the excitation of the gas by the incoming microwave energy; and since the strength of the latter varies in accordance with the signal which is amplitude-modulated thereon, so the transmitted infra-red radiation varies similarly. The transmitted infra-red radiation 184', now modulated in accordance with the signal, may be applied to a suitable detector 187, for example a bolometer thermistor of the type described in an application of J. A. Becker, Serial No. 602,261, filed September 26, 1946, Patent 2,414,792, January 28, 1947. The output of this detector 187 may be amplified as desired and reproduced in a suitable manner, for example, by a telephone receiver 188. Thus demodulation or detection of amplitude-modulated microwave radiation is effected through the medium of the resonant absorption band of a gas.

Figure 21:
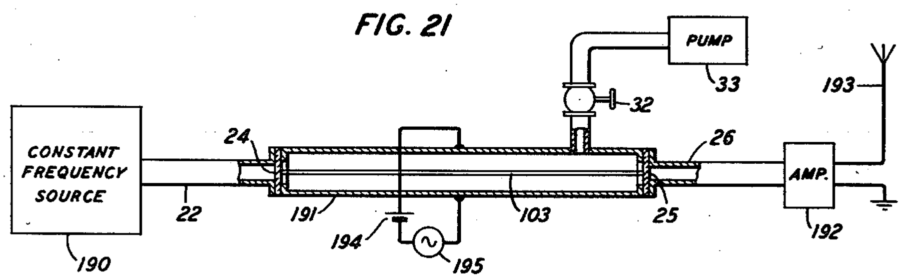
Fig. 21 is a schematic diagram of apparatus which is alternative to that of Fig. 19, and utilizing a signal frequency auxiliary field for modulation.
Figure 22:
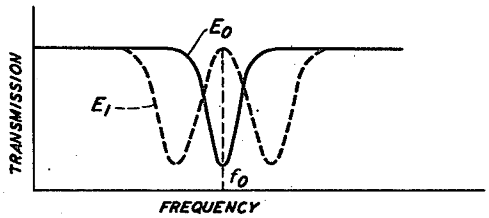
Fig. 22 is a diagram illustrating the operation of the apparatus of Fig. 21.

Fig. 21 shows another system for amplitude-modulating the microwave energy of a source in accordance with a desired signal. The principle here relied on is that discussed above in connection with Figs. 10 and 12, namely, that the resonant absorption band of a gas is spread apart into two bands, one higher and the other lower than the original resonant frequency, by the application of an auxiliary electric field. Thus a constant frequency microwave source 190 feeds its energy by way of a coupling wave guide 22 into a resonant gas chamber 191 which may be either of the elongated wave guide type or of the reflecting cavity type but is here shown as being of the elongated wave guide type. The gas may be confined in its chamber by mica windows 24, 25. The microwave energy which passes without absorption through the gas is guided by an output guide 26 to an amplifier 192 which may be coupled to a suitable load such as a radiating antenna 193. The opposite side walls of the guide are insulated from each other as by blocking condensers 103 in the manner described in connection with Figs. 10 and 11. The terminals of a voltage source, which may comprise a steady bias source 194 and an oscillatory signal source 195, for example, an audio frequency oscillation source, are connected to these side walls, respectively, to cause the production of an electric field transversely of the gas chamber 191. When the polarity and magnitude of the oscillating source are such that the net voltage applied across the gas chamber 191 is zero, the transmission curve of the system as a whole is as depicted in curve $E_0$ of Fig. 22. One-half cycle later of the signal source, full voltage is applied across the gas chamber and the gas resonance absorption curve is split, producing a two-peaked transmission curve as indicated in curve $E_1$ of Fig. 22. Thus, when the frequency of the microwave source is maintained at the original gas resonance frequency $f_0$ the transmission of the system as a whole, and consequently the radiation from the antenna, varies from a value proportional to the height of the negative peak of the curve $E_0$ to a value proportional to the height of the negative trough of the curve $E_1$ of Fig. 22. Since this alternation of radiated intensity varies in accordance with the modulating signal, a microwave modulator is provided, utilizing the resonant absorption characteristics of the gas.

Figure 23:
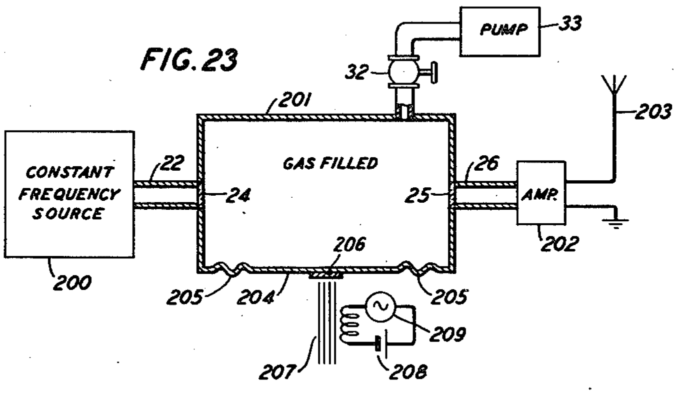
Fig. 23 is a schematic diagram of still other amplitude-modulating apparatus.
Figure 24:
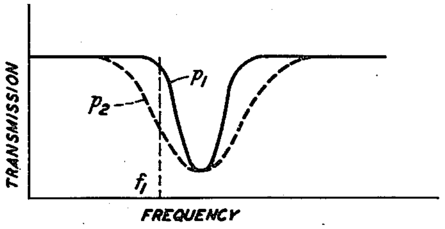
Fig. 24 is a diagram illustrating the operation of the apparatus of Fig. 23.

Still another amplitude-modulating system is shown in Fig. 23. Here a constant frequency microwave source 200 feeds its energy by way of a wave guide 22 and through a mica window 24 into a resonant gas chamber 201, here shown of the tuned cavity type. Microwave energy which is not absorbed by the gas passes through a second mica window 25 and is carried by an output wave guide 26 to an amplifier 202 which, in turn, supplies it to a suitable load, such as a radiating antenna 203. One wall 204 of the resonant gas chamber is arranged to be deflected in accordance with a signal. For example, it may be mounted on a metal bellows 205 and may be provided with an insert 206 of magnetizable material and so moved by the attraction of an electromagnet 207. The latter may be energized by a voltage comprising a bias source 208 and a signal source 209. Movement of the gas chamber wall 204 in accordance with the source signal results in alternately compressing or rarefying the gas within the chamber 201. As hereinabove stated, the width of the gas absorption band is dependent on the gas pressure, so that, as the movable wall of the gas chamber is moved inward and outward in accordance with the signal, the absorption of the microwave energy by the gas is represented successively by the curves $p_1$ and $p_2$ of Fig. 24. When the frequency of the source 200 is stabilized at a frequency off resonance for the gas, for example, at the frequency $f_1$ of Fig. 24, this results in a transmission through the gas of more or less of the microwave energy, dependent on the instantaneous condition of the modulating signal. Thus there is provided a system for modulating the energy of a microwave source through the medium of the resonant absorption of a gas and the modification thereof by alteration of its pressure.

Figure 25:
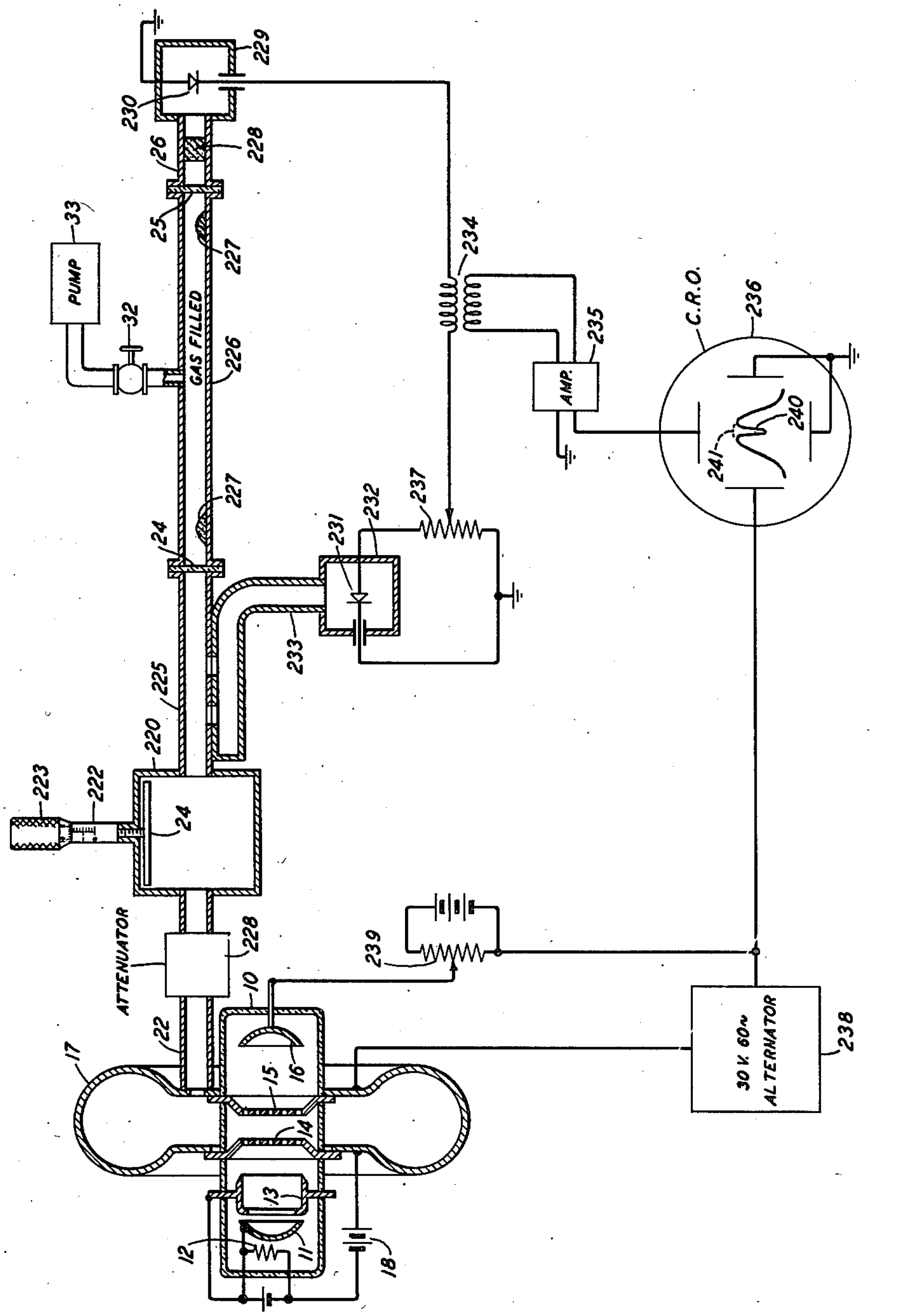
Fig. 25 is a schematic diagram of apparatus suitable for calibration of a microwave resonant cavity against the molecular resonance of a gas.

Fig. 25 shows a system for utilizing the resonant absorption frequency of a gas as a standard against which to calibrate microwave resonant elements of other types, for example, an adjustable wave meter 220. A source 10 of variable frequency microwave energy, for example an oscillation source similar to that of Fig. 1, supplies its energy by way of a coupling guide 22 from the cavity resonator 17 to an adjustable resonant cavity 220 of known variety. The frequency to which the latter is tuned may be adjusted by the movement inward and outward of a plunger or plate 221 which may be mounted, for example, on a threaded shaft 222 provided with an adjustable calibrated knob 223. The energy passing through this cavity resonator 220 enters a wave guide 225 to which is coupled a resonant gas chamber 226 terminated at either end with mica windows 24, 25 in the manner heretofore described, and likewise provided with a valve 32 and a pump 33 for the introduction of the gas and adjustment of its pressure.

To minimize reflections of microwave energy at the ends of the gas chamber, these may if desired be provided with attenuators, for example wedge-shaped blocks 227 of carbon-containing material. Likewise atenuators 228 which may be similar or of any other desired variety may be inserted in the input guide 22 and the output guide 26 to minimize energy reflection from the associated terminal apparatus.

Wave energy passing through the gas chamber 226 is carried by an output guide 26 to a chamber 229 enclosing a detector 230 which may advantageously be of the efficient silicon rectifier variety.

Another rectifier 231 which may likewise be a silicon rectifier enclosed in a chamber 232 is supplied with energy from a wave guide 233 which is coupled to the cavity output wave guide 225 by a directional coupler device of the type described in the aforementioned application of W. W. Mumford, Serial No. 540,252, filed June 14, 1944, issued as United States Patent Number 2,562,281, July 31, 1951, which admits energy from the tunable cavity 220 to the rectifier 231 but prevents its passage in the reverse direction. The output circuits of the two rectifiers are coupled in differential fashion by way of a transformer 234 to an amplifier 235 whose output terminals are connected to the vertical deflection plates of a cathode ray oscilloscope 236. The relative magnitudes of the outputs of the two rectifiers may be adjusted in any convenient manner, for example by the use of a variable resistor 237.

The horizontal deflecting plates of the cathode ray oscilloscope 236 are energized at a suitable voltage and frequency, for example, 30 volts and 60 cycles per second derived from a suitable low frequency source 238.

In operation, the frequency of the oscillator source 10 is first adjusted, as by adjustment of the voltage of the repeller anode 16 to which end the tapped resistor 239 is provided, to substantially the frequency of the resonant absorption band of the gas in the chamber 226. When the sweeping oscillator 238 is actuated the repeller electrode voltage rises and falls above this value so that the oscillator frequency sweeps through a frequency range including the gas resonance frequency. At the same time cathode beam is caused to sweep across the screen of the cathode ray tube 236 in synchronism with the oscillator frequency sweep. As the oscillator frequency passes through the gas resonance frequency, absorption occurs in the gas and the output of the rectifier 230 is reduced as compared with the output of the rectifier 231, thus causing a dip 240 in the trace on the oscilloscope screen.

The tuned cavity 220 to be calibrated is now adjusted until its resonance frequency coincides with the gas resonance frequency as indicated by the fact that the peak 241 of its resonance curve coincides on the cathode ray oscilloscope screen with the dip 240 in the trace due to the gas. When this result is secured it is known that the cavity is tuned precisely to the gas resonance frequency, whose exact value has been previously determined. The calibrations of the micrometer knob of the tunable cavity 220 may now be checked accordingly. A resonantly absorptive gas is useful as an ultra-high frequency standard because the resonant frequency may be known with great exactitude and because it is not influenced by changes in pressure, temperatures, or the like.

Figure 26:
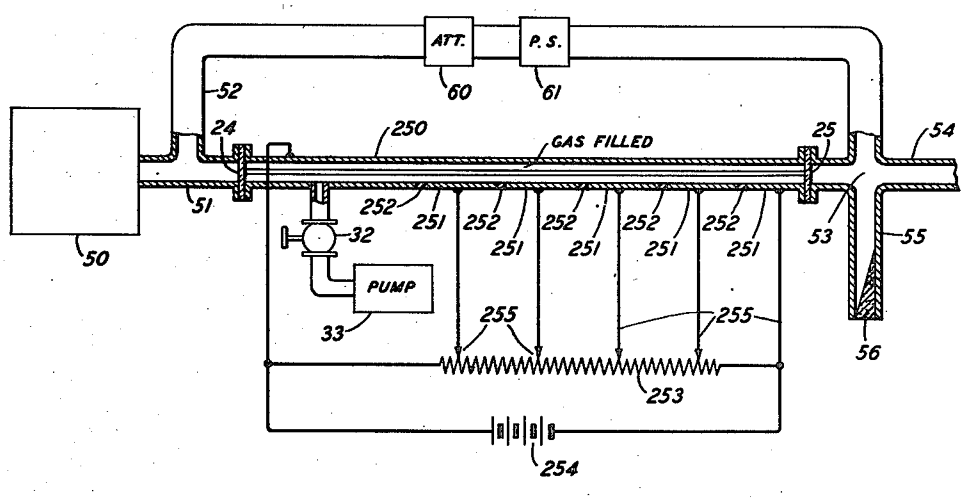
Fig. 26 is a schematic diagram of a microwave band-pass filter utilizing molecular gas resonance.

In the foregoing description, particularly with reference to Figs. 10, 13 and 21, an auxiliary electric field was employed to spread the resonant absorption band of the gas into two subsidiary bands. In each case it was assumed that the strength of this auxiliary field had a unique value throughout the gas so that the splitting of the gas absorption band was entirely definite. In accordance with the invention, however, a gradation in the strength of the auxiliary field and therefore a gradation in the amount of absorption band splitting may be advantageously employed, for example in the construction of a band-pass filter. Fig. 26 shows such an arrangement, wherein the graded auxiliary field is employed as a refinement on the bridge circuit of Fig. 6. As in Fig. 6, incoming energy from a source 50 is divided into two paths, one 51 containing a resonant gas chamber 250 and the other 52 being gasless. An attenuator 60 and a phase shifter 61 may be provided in the gasless path for the same reason as in the case of Fig. 6, and the two paths may be brought together by way of a hybrid T 53, the series or electric plane arm which carries the energy difference of the two paths 51, 52 being coupled to an outgoing wave guide 54 and the shunt or magnetic plane arm 55 being terminated in an energy absorber 56.

To obtain the same transmission characteristics as a wide band-pass filter, the gas chamber 250 may advantageously contain a mixture of a number of different gases having their resonant frequencies spaced apart; and, in addition, each gas absorption band may be split to varying degrees throughout the length of the microwave path through the gas. This graded splitting may conveniently be accomplished by dividing one side of the gas chamber 250 into a plurality of different conductors 251, separated from each other by blocking condensers 252 which retain the gas and offer low impedance paths to the passage of microwave energy. Each of these separate conducting portions 251 may be supplied with voltage of a different value, for example from a potentiometer resistor 253 connected to the terminals of a source 254 and having a number of different adjustable taps 255, each connected to one of the wall sections 251.

The effect of such a system is to provide an amount of band splitting which is graded lengthwise of the gas chamber. When, now, the gas pressure is adjusted to broaden each of these bands until neighboring bands merge into each other, the over-all effect is of a broad absorption band. As in the case of Fig. 6, this absorption band for the gas is converted into a pass band for the bridge arrangement as a whole. Thus there is provided a band-pass filter based on the resonant absorption of a plurality of different gases and on the spreading of the absorption bands of the various gases by the use of a graded auxiliary field and proper adjustment of the gas pressure.

Figure 27:
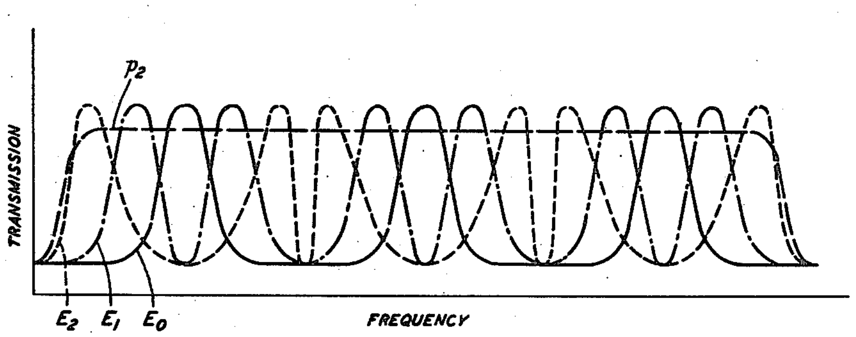
Fig. 27 is a diagram illustrating the operation of the apparatus of Fig. 26.

The operation of Fig. 26 is illustrated in Fig. 27, which shows the absorption characteristic of a gas mixture having three different resonant frequencies in curve $E_0$. In curve $E_1$ each of these is split to a small extent by the application of a small auxiliary field. In curve $E_2$ each is further split by the application of a stronger auxiliary field. In curve $p_2$ there is indicated the over-all effect of blending these variously split absorption bands together by proper adjustment of the gas pressure until each absorption band merges with its neighbors.

The principles explained in connection with Figs. 26 and 27 may, of course, be employed in apparatus such as that of Figs. 10, 13 and 19, if desired.

Various other embodiments of the invention will suggest themselves to those skilled in the art.

What is claimed is:

1. In combination, a microwave oscillator having an output path and a frequency-control electrode, a pair of chambers coupled to said path, one of said chambers containing a gas which is selectively absorbent to waves of a frequency higher than the desired frequency, the other of said chambers containing a gas which is selectively absorbent to waves of a frequency lower than the desired frequency, and means differentially coupled to the fields within said chambers and connected to said control electrode for jointly controlling the potential of said frequency-control electrode.

2. In combination, a tunable source of microwave energy, a pair of chambers coupled to said source, one of said chambers containing a gas which is selectively absorbent to waves of a frequency higher than the nominal frequency of said source, the other of said chambers containing a gas which is selectively absorbent to waves of a frequency lower than the nominal frequency of said source, means for deriving a signal related to the difference between the absorption by one of said gases and the absorption by the other, and means for varying the frequency of said source under control of said difference frequency.

3. Apparatus as defined in claim 2 wherein said gases are of like chemical constitutions and of different isotopic constitutions.

4. Apparatus as defined in claim 2 wherein said gases are of the same constitutions, their resonance absorption frequencies being rendered different by the impression of an electromagnetic field on one of said gases.

5. A frequency modulation system comprising a microwave source, a gas which is molecularly resonant to microwaves of a preassigned frequency, means for controlling the frequency of said source by said gas resonant frequency, means for applying an electromagnetic field to said gas to alter said gas resonant frequency, and means for varying the strength of said electromagnetic field under control of a modulating signal, whereby the oscillations of said microwave source are frequency-modulated in accordance with said signal.

6. The method of stabilizing the frequency of an oscillator, which consists in applying a frequency range of radio waves to a gas that possesses characteristic molecular absorption frequencies in said range, utilizing the unabsorbed radio waves to derive a control voltage, and applying said control voltage to said oscillator to regulate the frequency of said oscillator.

7. The method defined in claim 6, and applying a constant electric field to said gas to produce a Stark effect pattern of frequencies therein.

8. A microwave oscillator system for generating oscillations of highly precise frequency comprising a microwave generator including a resonant cavity, a chamber containing a body of gas exhibiting molecular resonance at said frequency, and a transmission line coupling said chamber to said cavity to reflect therein reactive effects of the gas as the frequency of the generated oscillations deviate from the molecular resonant frequencies of the gas.

9. The method of employing the resonant absorption characteristics of a microwave absorptive gas to stabilize the frequency of a microwave signal source comprising confining said gas within a fixed volume substantially non-resonant at the operating microwave frequency of said source, adjusting the pressure of said confined gas to a value less than $10^{-1}$ mm. of mercury, applying signals from said source to excite molecular resonance in said gas, detecting signals transmitted by said gas, deriving a control signal from said detected signals, and applying said control signal to said source to stabilize the frequency of said source signals.

10. Apparatus for employing the resonant absorption characteristics of a microwave absorptive gas to stabilize the frequency of a microwave signal source comprising a microwave signal source of adjustable frequency, a wave guide signal transmission system substantially non-resonant at the operating microwave frequency for enclosing a fixed volume of said gas at low pressure, means for applying signals from said source through said wave guide system to said confined gas to provide microwave molecular resonant absorption therein, means coupled into said wave guide for detecting signals transmitted by said gas, and means for applying said detected signals to said source to stabilize the frequency of said source signals.

11. Apparatus for employing the resonant absorption characteristics of a microwave absorptive gas to stabilize the frequency of a microwave signal source including a microwave signal source of adjustable frequency comprising a reflex cavity microwave generator having a cathode and an electron reflecting element, a wave guide signal transmission system enclosing a fixed volume of said gas at low pressure, wave guide coupling means for applying signals from said source through said wave guide to excite molecular resonance in said confined gas, means coupled into said wave guide for detecting signals transmitted by said gas, second means coupled to said source for detecting said source signals, means for combining said detected signals, means for deriving a control signal from said combined signals, and means for applying said control signal to said reflecting element of said signal source to stabilize the frequency of said source signals.

12. Apparatus for employing the resonant absorption characteristics of a microwave absorptive gas to stabilize the frequency of a microwave signal source comprising a microwave signal source of adjustable frequency having a frequency control element responsive to applied potentials, a wave guide signal transmission system enclosing a fixed volume of said gas at low pressure, means for applying signals from sair source through said wave guide system to excite molecular resonance in said confined gas, means coupled into said wave guide for detecting signals transmitted by said gas, second means coupled to said source for detecting said source signals, means for combining said detected signals, means for deriving a control signal from said combined signals, and means for applying said control signal to said frequency control element of said source to stabilize the frequency of said source signals.

13. The method of employing the resonant absorption characteristic of a microwave absorptive gas for stabilizing the frequency of a microwave generator which comprises exciting the gas by the generated oscillations, applying a field to said gas to shift the frequency of its molecular resonance, and stabilizing the frequency of said generator in response to the shifted molecular resonance of the gas.

14. The method of stabilizing the frequency of a microwave generator which comprises impressing the generated oscillations upon two bodies of gas exhibiting molecular resonance, applying to at least one of said bodies of gas a field to provide for molecular resonances of said bodies of gas at frequencies respectively slightly higher and lower than the desired frequency of said generated oscillations, and stabilizing the frequency of said generator in response to said molecular resonances.

15. The method of employing the resonant absorption characteristics of a microwave absorptive gas for stabilizing the frequency of a microwave generator which comprises adjusting the pressure of said gas to less than $10^{-1}$ millimeter of mercury for exhibition by the gas of sharp molecular resonance at a frequency substantially displaced from the desired frequency of operation of said generator, applying a field to said gas to shift its aforesaid resonant frequency to substantial coincidence with said desired frequency, and stabilizing the generator by molecular resonance of the gas at the frequency to which shifted by said field.

16. The method of employing the resonant absorption characteristic of a microwave absorptive gas for stabilizing the frequency of a microwave generator which comprises exciting the gas by the generated oscillations, applying a unidirectional field to said gas to shift the frequency of its molecular resonance into substantial coincidence with the desired frequency of said oscillations, and stabilizing the frequency of said generator in response to the shifted molecular resonance of the gas.

17. The method of stabilizing the frequency of a microwave generator having a resonant cavity as the frequency-determining element which comprises impressing the generated frequency upon a gas exhibiting molecular resonance at the desired operating frequency of the generator, and reflecting the reactance of the gas at the generated frequency into said resonant cavity to pull the generated frequency to the frequency of molecular resonance of the gas.

18. Apparatus for employing the resonant absorption characteristics of a microwave absorptive gas to stabilize the frequency of a microwave signal source comprising a microwave signal source of adjustable frequency, a waveguide signal transmission system for enclosing a volume of said gas at low pressure, means for applying signals through said wave guide to excite molecular resonance in said confined gas, means for detecting signals transmitted by said gas, a second means for detecting signals transmitted in a path free of said gas, means for combining the detected signals, means for deriving a control signal from said combined signals, and means for applying said control signal to stabilize the frequency of said source.

19. The method of stabilizing the frequency of an oscillator which comprises applying microwave energy to a gas at low pressure and exhibiting molecular resonance within the frequency range of said microwave energy, deriving a control voltage from unabsorbed microwave energy transmitted by said gas, and applying said control voltage to stabilize the frequency of said oscillator.

20. A frequency stabilized oscillation source including means for generating oscillations, a microwave energy absorptive gas, means responsive to said source for exciting molecular microwave resonant absorption in said gas, and means responsive to said absorption for stabilizing the frequency of said oscillations.

21. A frequency modulation system comprising, in combination, an electric oscillation generator, means including an enclosed body of gas that exhibits molecular resonance to fix the mean operating frequency of said oscillation generator, and means to vary the said operating frequency under the control of a modulating signal.

22. A frequency modulation system in accordance with claim 21 in which said last-mentioned means comprises means to impress on said gas an electromagnetic field that varies in strength under the control of said modulating signal.

23. The method of stabilizing a microwave oscillation generator the operating frequency of which tends to drift from a desired operating frequency, which comprises impressing the generated oscillations on a body of gas that exhibits molecular resonance absorption at the desired operating frequency, and continually impelling the operating frequency of said generator toward said desired frequency under the control of and in response to the change in reaction of said gas to the impressed oscillations that accompanies change in the relation between the molecular resonance frequency and the frequency of the said impressed oscillations.

24. In combination a generator of electric oscillations and an oscillation frequency stabilizer comprising an enclosed body of gas that exhibits molecular resonance absorption and acts as a primary frequency standard for said stabilizer, means for applying to said gas microwave energy of frequency in the range of said molecular resonance absorption, thereby producing variations in the electrical transmission characteristic of said gas with variations in the frequency of said energy, and means responsive to said variations in the electric transmission characteristic of said gas for effecting the control of the frequency of the oscillations produced by said generator.

25. In combination a generator of electric oscillations an an oscillation frequency stabilizer comprising an enclosed body of gas that exhibits molecular resonance absorption, is rarefied to resolve its individual molecular resonance lines, and acts as a primary frequency standard for said stabilizer, means for applying to said gas microwave energy of frequency within the resonance absorption band of at least one of the resolved lines to produce an electrical reaction varying distinctly with the frequency of said energy, and means responsive to said variations in electrical reaction for effecting the control of the frequency of the oscillations produced by said generator.

26. A control system for stabilizing the frequency of a microwave oscillator comprising a gas cell exhibiting molecular resonance within the operating frequency range of said oscillator, means for impressing output energy from said oscillator upon said gas cell, a Stark electrode in said gas cell, and a source of voltage connected to said electrode to shift the molecular resonance of said gas.

References Cited in the file of this patent

UNITED STATES PATENTS

| | | |
|---|---|---|
| 2,077,314 | Eberhard | Apr. 13, 1937 |
| 2,085,406 | Zworykin | June 29, 1937 |
| 2,106,770 | Southworth | Feb. 1, 1938 |
| 2,173,234 | Linder | Sept. 19, 1939 |
| 2,423,383 | Hershberger | July 1, 1947 |
| 2,457,673 | Hershberger | Dec. 28, 1948 |
| 2,624,840 | Hershberger | Jan. 6, 1953 |

OTHER REFERENCES

Ph.D Thesis by Howe, University of Michigan, 1940.

Physical Review, February 15, 1934, pages 234 and 237.